United States Patent [19]
Walters

[11] Patent Number: 5,664,418
[45] Date of Patent: Sep. 9, 1997

[54] WHIRL-WIND VERTICAL AXIS WIND AND WATER TURBINE

[76] Inventor: Victor Walters, P.O. Box 250, Sechelt, British Columbia, Canada, V0N 2A0

[21] Appl. No.: 625,103

[22] Filed: Apr. 1, 1996

Related U.S. Application Data

[63] Continuation-in-part of Ser. No. 156,701, Nov. 24, 1993, Pat. No. 5,503,530.

[51] Int. Cl.[6] .......................... F03B 13/18; F03B 13/24; F03B 13/26; F03D 3/04
[52] U.S. Cl. ........................ 60/398; 60/500; 60/506; 290/53; 290/55; 415/3.1; 415/4.2; 415/7; 415/8; 415/122.1; 415/123; 415/907; 416/85; 416/169 R; 416/170 R; 416/197 A; 416/DIG. 4; 417/332
[58] Field of Search ....................... 415/2.1, 3.1, 4.1, 415/4.2, 4.4, 7, 8, 906, 907, 122.1, 123, 124.1; 416/85, 86, 169 R, 170 R, 197 A, DIG. 4; 417/332; 60/398, 500, 506; 440/9; 290/42, 44, 53, 55

[56] References Cited

U.S. PATENT DOCUMENTS

| 204,481 | 6/1878 | Cleland | 415/4.1 |
| 3,994,621 | 11/1976 | Bogie | 416/197 A |
| 4,031,405 | 6/1977 | Asperger | 415/4.4 |
| 4,560,884 | 12/1985 | Whittecar | 290/42 |
| 5,183,386 | 2/1993 | Feldman et al. | 415/4.2 |
| 5,503,530 | 4/1996 | Walters | 416/197 A |

FOREIGN PATENT DOCUMENTS

| 0167694 | 1/1986 | European Pat. Off. | 415/4.2 |
| 3631709 | 3/1988 | Germany | 415/4.2 |
| 7712530 | 11/1977 | Netherlands | 415/2.1 |

*Primary Examiner*—Christopher Verdier
*Attorney, Agent, or Firm*—David J. French

[57] ABSTRACT

A vertical axis wind turbine is supported by a frame held in place by an encircling series of crescent-shaped tubular deflector vanes. The vanes widen towards the turbine core, concentrating the wind. The wind is trapped momentarily on entering the turbine cavities. Air can be supplied to such cavities from a compressed air source driven by wave action on a body of water.

4 Claims, 5 Drawing Sheets

WHIRL-WIND VERTICAL AXIS WIND AND WATER TURBINE

CROSS-REFERENCE TO RELATED APPLICATIONS

This application is a continuation-in-part of U.S. patent application Ser. No. 08/156,701 filed Nov. 24, 1993 and now issued as U.S. Pat. No. 5,503,530.

FIELD OF THE INVENTION

This invention relates to wind and turbines of the type wherein a vertical shaft is turned by the wind or water. More particularly, it relates to an improved method of construction of such a turbine.

BACKGROUND TO THE INVENTION

Vertical axis wind turbines have an ancient history going back to Persian windmills of the first millennium. By the end of the nineteenth century and early 20th century numerous designs were conceived for vertical axis windmills that incorporate a series of exterior vanes to deflect the wind entering the turbine and enhance its performance.

Prior art patents of this type include:

| | |
|---|---|
| U.S. Pat. No. 204,481 to Cleland | U.S. Pat. No. 1,619,643 to Webb |
| U.S. Pat. No. 343,000 to Bouteiller | U.S. Pat. No. 1,144,737 to Sterner |
| U.S. Pat. No. 591,962 to Evison | U.S. Pat. No. 1,441,774 to Adams |
| U.S. Pat. No. 683,935 to Hensel | U.S. Pat. No. 2,812,823 to De Oviedo |
| U.S. Pat. No. 840,208 to Hartong | U.S. Pat. No. 4,017,204 |
| U.S. Pat. No. 964,374 to Bey | Australian 145,115 |
| U.S. Pat. No. 1,015,695 to Liston | Germany 3,631,709 |
| U.S. Pat. No. 1,082,883 to Lefler | European 167,694 A |
| U.S. Pat. No. 1,127,400 to Cain | French 2,448,099 |
| German 2,835,927 | Netherlands 7,712,530 |
| United Kingdom 667,587 | U.S.S.R. 1,211,448 |
| Japan 178,564 | |

Generally, these patents address such features as speed-control governors. The turbine buckets or troughs that serve as impellers are either open or closed, according to whether the wind may flow past such buckets into the interior region of the turbine, around its vertical axis. The exterior vanes in these references are angled to direct wind more nearly perpendicularly into the receiving face of the rotating buckets, and to shield the returning impellers from exposure to the wind. As depicted in the references, these deflecting exterior vanes are all formed of single sheets of curved metal or the like.

Further more recent patents include the following:

U.S. Pat. No. 3,793,530 to Carter

U.S. Pat. No. 3,938,907 to Mogoveny et al

U.S. Pat. No. 4,017,204 to Sellman

U.S. Pat. No. 4,725,194 to Bartsch

U.S. Pat. No. 4,872,804 to DeMenezes

Of these references, several show "funnelling" features leading up to the turbine inlets to concentrate and speed-up the wind as it enters the turbine impellers. As well, the exterior vanes mentioned previously intrinsically serve to concentrate the wind as they extend between outer and inner cylindrical openings and close together in a normal, radial-like manner.

Generally, the vertical series of known wind-receiving impellers and the outer encircling array of deflector vanes are held in place by respective pairs of end plates to which the ends of these components are fastened. The axis of the turbine itself is generally fitted into the upper plate which caps the deflector vanes and frames the turbine. As the force of the wind will develop a substantial toppling torque on the entire turbine structure, it is important that this outer frame formed by the deflector vanes and their end plates will constitute a rigid and stable structure.

This is all the more so true because the preferred aspect ratio for a vertical wind turbine will provide for a height that is greater than its width (providing for more wind-receiving surfaces in an elevated position). Thus, the stabilization of the outer deflector frame is akin to the problem of supporting a relatively small roof with an encircling series of relatively lengthy columns and providing strength to resist lateral wind forces.

The present invention provides an improvement in this structural support aspect of vertical axis wind turbines. As a further feature, this invention improves the performance of such turbines by increasing the concentration effect of air entering the turbine. Additionally, the air or other fluid entering the turbine buckets or troughs is contained momentarily in a manner which further contributes to the performance of the turbine. Additionally, an improved method of extracting the rotary power is provided.

By a further feature, a wind turbine according to the invention is suited for operation in conjunction with a source of compressed air as an alternative or supplemental to wind energy.

By a further feature, a turbine according to the invention is suited for use in extracting energy from water which is in motion. In particular, it is suited to being driven by a reciprocating or reversing flow of water.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to the invention in its broader aspect, a vertical axis turbine having a turbine rotor with vertical impeller surfaces is provided with a surrounding circumferential series of vertically deployed deflector vanes, each of which is tubular (in the most general geometric sense) in shape, extending from an edge at its outer circumferential boundary and widening towards the central axis of the turbine to form a generally three-sided cross-section. This cross-section terminates with a base located at the inner circumferential boundary of the series of deflector vanes, sealingly positioned next to the outer circumferential path boundary of the turbine rotor. This three-sided cross-section is preferentially curved in a semi-crescent form to both concentrate the flow of a fluid, such as air or water, entering the turbine (beyond the concentration arising from the radial closing of the deflector vane's active surface) and deflect the fluid flow to direct it against the active surfaces of the turbine impellers at a more nearly perpendicular orientation.

In a preferred configuration for operation with air the tubular deflector vanes are closed on their inner, base sides, facing the turbine, whereby air received by the turbine impellers is contained momentarily by such closed, inner base sides as the turbine rotates past each tubular deflector vane. This feature is particularly preferred where the receiving surfaces of the impellers of the turbine are formed within troughs or buckets that are closed on their inner, axially-directed edges to provide closed impeller cavities. The close sealing clearance between the circumferential boundaries of these closed impeller cavities serves to momentarily trap air as these cavities pass the inner base sides of the deflector vanes.

As an optional feature of the invention, the turbine rotor itself may be formed by a series of tubular elements contained between upper and lower turbine end plates, such tubular elements also having a triangular-like or semi-crescent shaped cross-section that is not necessarily the same as that of the deflectors.

In accordance with the invention the turbine system in wind mode captures the wind in a vertical chamber from which the wind cannot escape. The wind (which is energized air) must push the turbine impellers forward as the wind pressure in the adjoining chambers forces the turbine to rotate. Thus, the wind energy is momentarily captured and work or power is taken out of it, as by an electrical generator coupled to the turbine rotor. A model built which is 10 feet high to 10 feet wide supports the contention as there is substantially no high velocity wind exiting the lee side of the turbine.

By a further feature of the invention, this turbine may be modified to receive air from a source of pressurized air whereby the energy content of the pressurized air can drive the turbine. A convenient source of pressurized air can be provided by a wave-activated air compressor. Thus the turbine of the invention can be driven simultaneously by both wind and wave energy.

In another variant of the invention the turbine may be immersed in a current of water and thereby extract energy from such current. Because of the capacity of the turbine to receive a fluid flow from essentially any direction the water current may be reciprocating, as occurs with wave action, or in a tidal race (i.e. a narrow passage through which tidal waters ebb and flow).

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
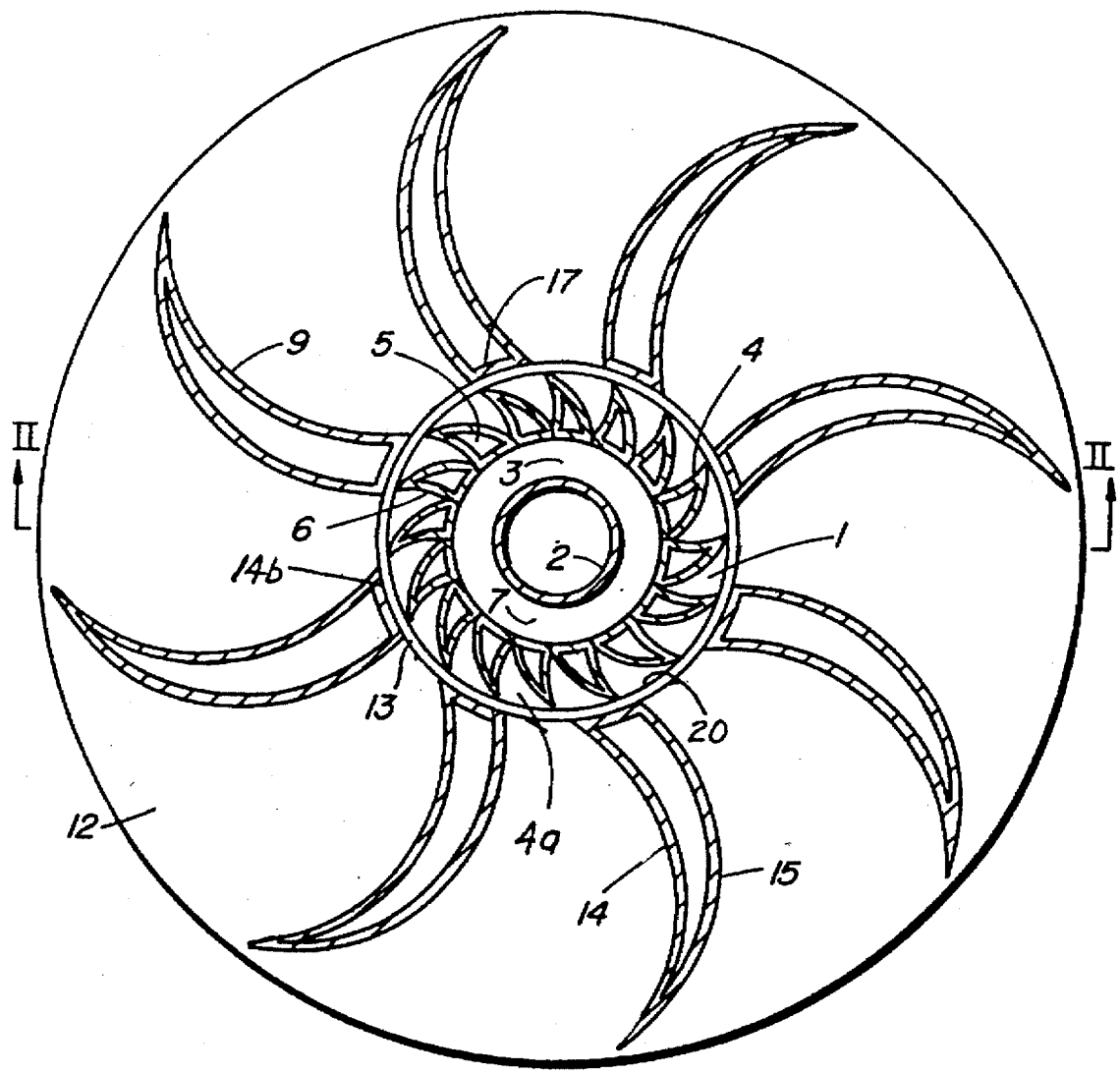
FIG. 1 is a cross-sectional plan view along lines I—I of FIG. 2 of a turbine according to the invention.

In FIG. 1 an inner turbine rotor 1 has a vertical axle 2 in the form of a pipe fixed at its lower end to the center of the turbine lower end plate 3. A series of turbine impellers 4 are formed from tubular sheet metal walls 5 which may optionally close towards the axle 2 to provide a generally triangular cross-section. The impeller cavities 4a have an active surface 6 and are closed-off from the interior axial volume 7 of the turbine to form a sealed impeller cavity.

At the outer circumferential boundary 20 of the turbine 1 the outer edges 21 of the impeller walls 5 pass so close to the inside surface of the closed base panel 17 on the tubular cylinder 9 that when an impeller cavity 4a is closed-off by the inside surface of the base panels 17 the air within the cavity 4a is trapped and substantially retains any pressurized condition it may have.

By forming the impeller cylinder 5 as a closed tube, a series of box-beam-like elements of corresponding strength are created. These may be fastened to the lower and upper turbine end plates 3, 3a as by welding or bolting. This permits the turbine rotor 1 to be readily assembled into a strong, ridged structure.

Without the use of the triangular shaped tubular impellers, the turbine would require an extremely heavy single blade to stand the force of high winds.

Figure 2:
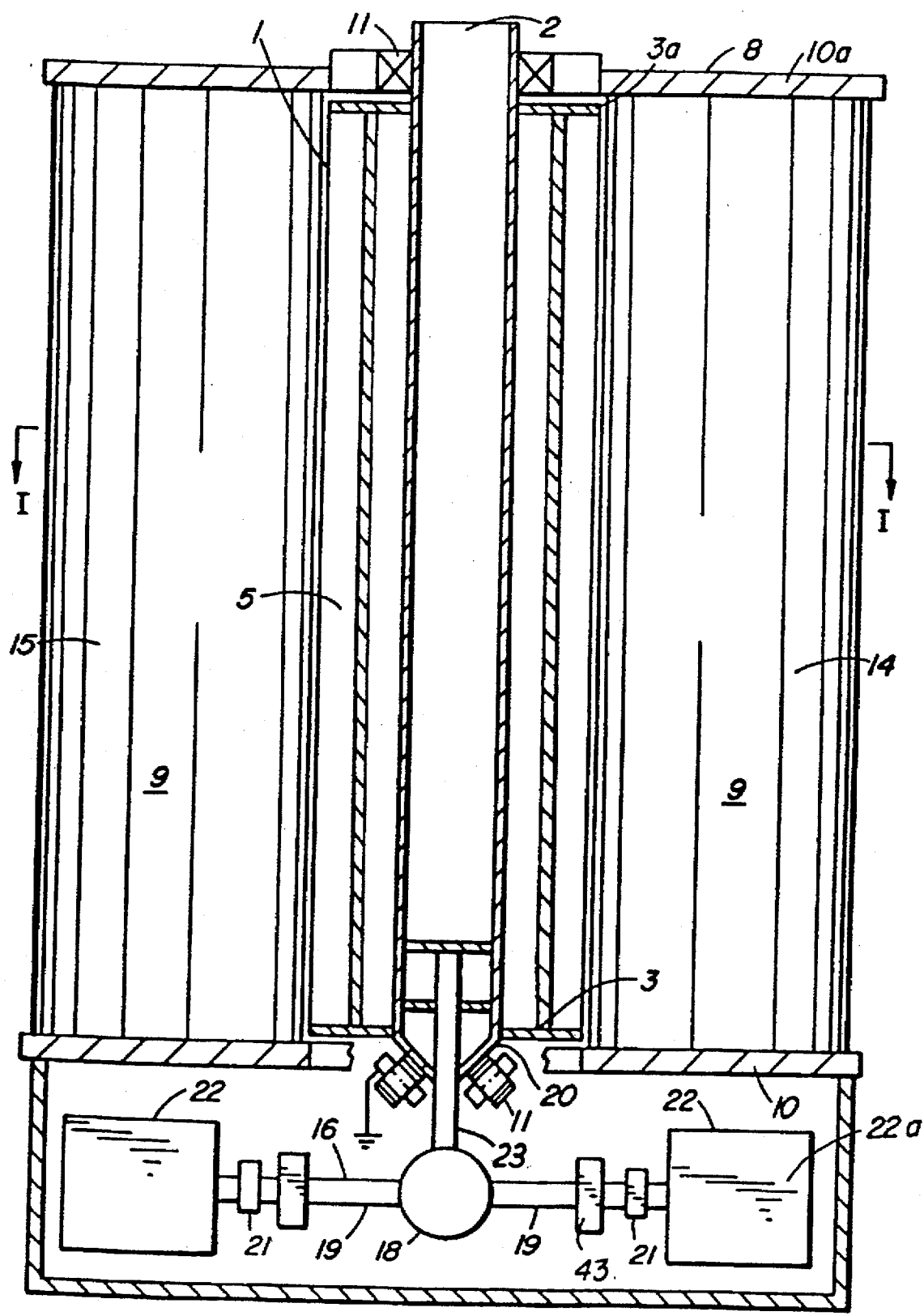
FIG. 2 is a cross-sectional profile view of the turbine of FIG. 1 taken from lines II—II in FIG. 1.

As shown in FIG. 2, the turbine 1 is held in place by an external frame 8 formed of a series of tubular deflector cylinders 9 fastened between lower and upper deflector end plates 10, 10a. The axle 2 of the turbine 1 is centrally mounted so as to be contained within the deflector end plates 10, 10a by low friction bearings 11 that bear against a conical bearing surface end plate 20.

The deflector tubes 9 have a generally three-sided cross-section, with a shape similar to a semi-crescent. They serve as "pillars" for supporting the end plates 10, 10a. This, as with the impeller cylinders 5, forms a box-beam-like element that provides great structural integrity and stability for the frame 8, allowing the turbine 1 to be free-standing and self-supporting.

The main problem causing failure in the other types of windmills is the high wind factor. The wind turbine of the invention can be built to withstand very strong winds with the pillars 9 supporting the turbine in the face of high winds coming from all directions. It is during the high wind period that the greatest amount of generating capacity is available.

The deflector tubes 9 provide a series of radial openings 12 that are tapered inwardly as proceeding to the deflector exit throat 13. This taper narrows the cross-sectional area for air entering the turbine rotor 1, forcing the air to increase its velocity. This feature is particularly important since the power available from the wind rises with the cube of wind velocity. Because of the widening that develops between the forward 14 and rearward 15 face of each deflector tube 9 as approaching the exit throat 13, a greater degree of narrowing of the air flow passageway in the exit throat 13 is established than would occur if the deflector tubes 9 were simply flat plates. Depicted is a narrowing ratio between the entry opening 12 and the exit throat 13 between the respective deflector tubings 9 of around 5 to 1 in solid outline of the deflectors 9, and around 11 to 1 may be used in an alternate configuration. These are not limits for the degree of narrowing that may be employed, but are exemplary values.

The deflector tubing 9 is preferably formed with a curve within the forward face 14 at its base end 14b that will direct air through the exit throat 13 in a direction that is approximately perpendicular to the active, wind-receiving surface 6 on the turbine impellers 4.

To remove rotary power from the turbine rotor 1, an automobile differential 16 type of arrangement is shown. The drive shaft 23 is coupled to the turbine shaft 2 and enters the differential gear box 18. The split axle drive shafts 19 carry power through brakes 43 and wheel-plate couplers 21 to electrical generators 22. Through use of differential gearing and dual generators the speed of one generator can be held fixed while surges in the speed of the turbine can be absorbed in the second generator 22. Alternately, one arm 22a of the differential 16 can be operated as a motor (while the generator 22 is locked by the brake 43) so as to keep the turbine in motion at all times. This will keep the turbine turning and allow it to respond rapidly to a rise in wind speed over the threshold operating value, for example, 10 miles per hour, when this threshold is exceeded.

Figure 3:
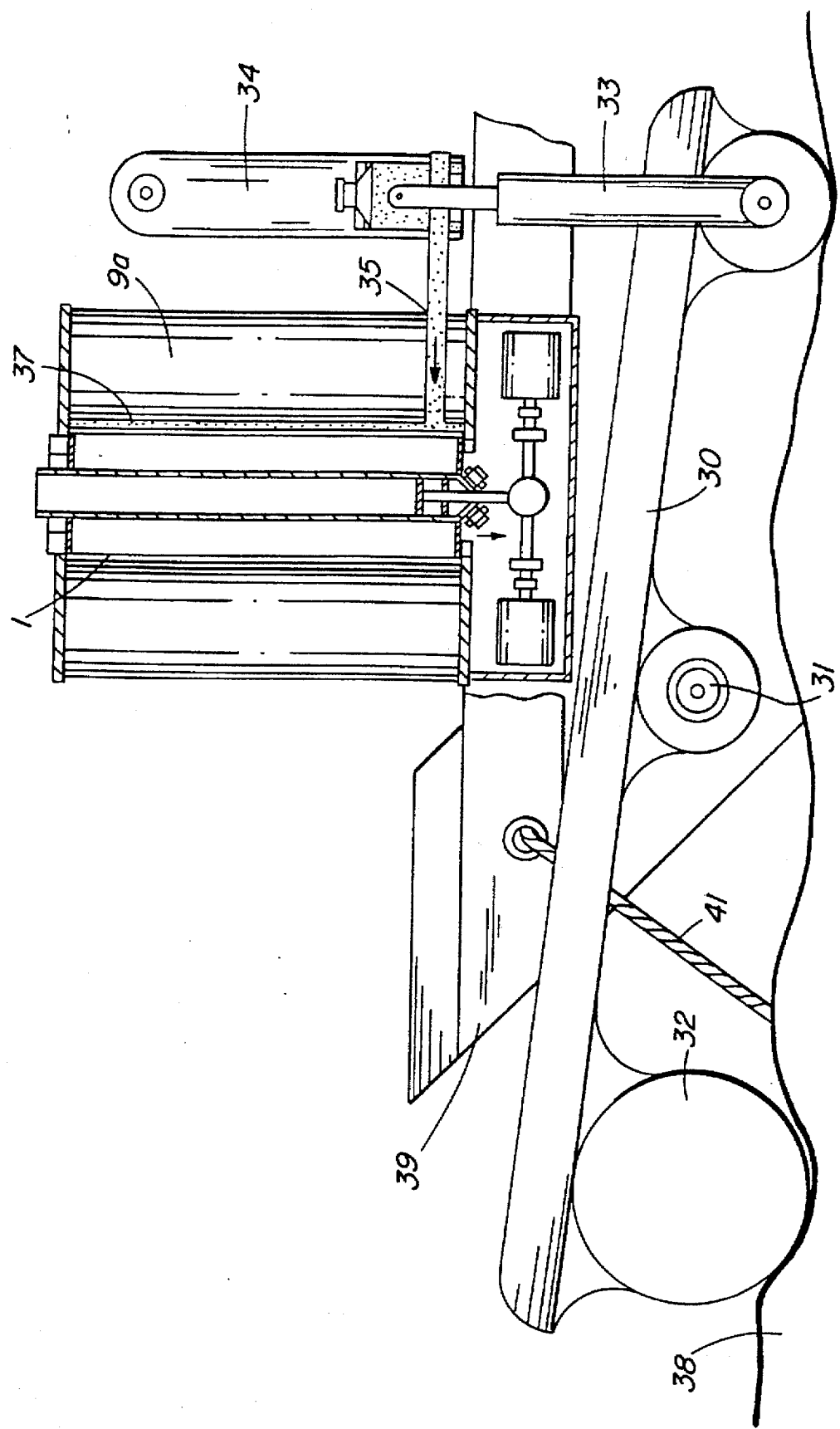
FIG. 3 is a pictorial partial cross-sectional depiction of a wave-driven air compressor delivering air to the turbine of FIG. 2.

In FIG. 3, an anchored and stabilized ship's hull 39 is modified to support a rocking arm 30 that is hinged about a pivot 31. One end of this arm carries a flotation tank 32. The other end is coupled to a piston rod 33 that compresses air in a cylinder 34.

Figure 4:
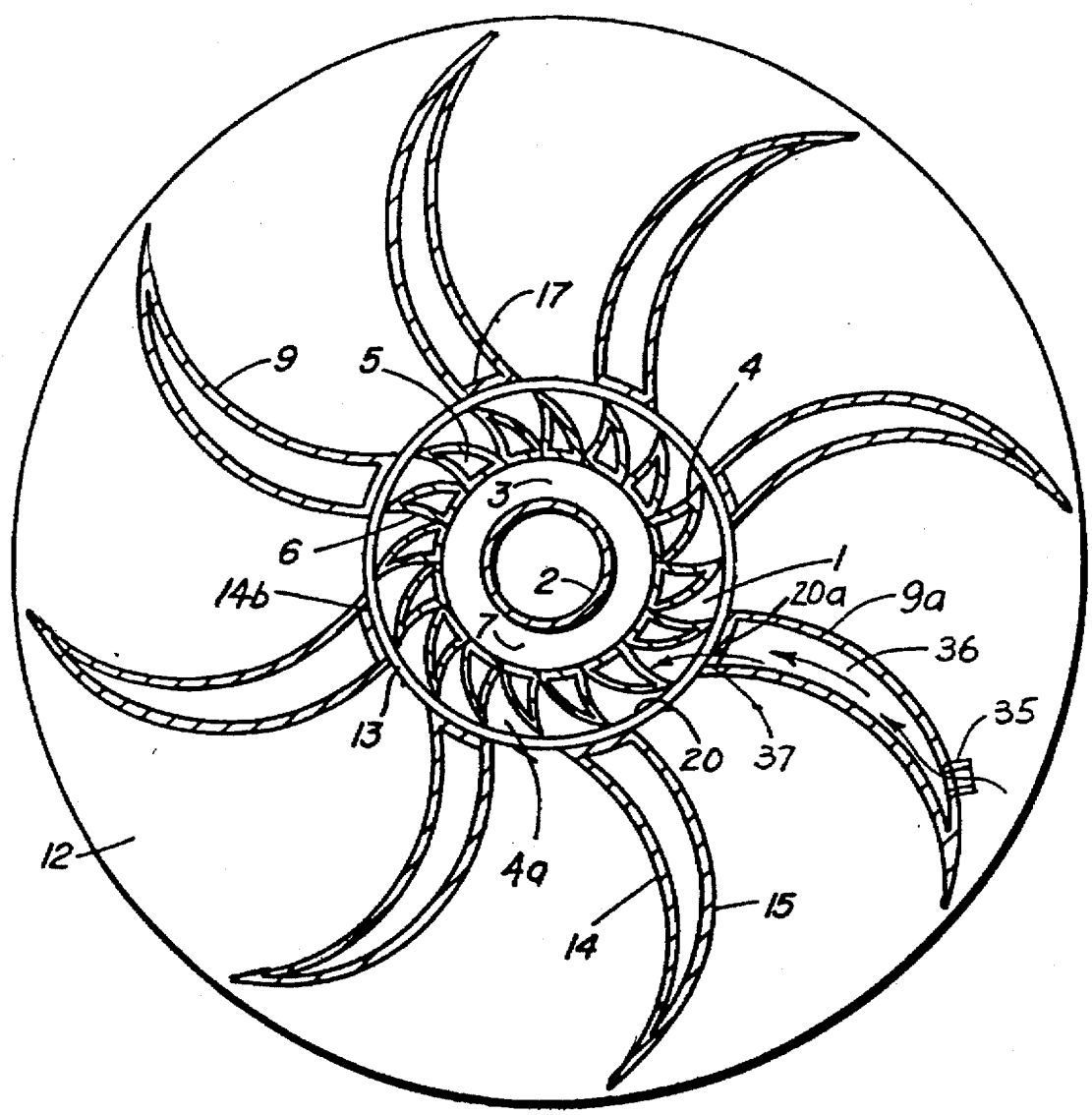
FIG. 4 is a cross-sectional plan view of the modified turbine of FIG. 3.

The compressed air is fed to one of the closed tubular cylinders 9a of the turbine 1 that is modified as shown in FIG. 4 to have an air inlet 35 for receiving air into the inner volume portion 36. This modified cylinder 9a has an air outlet 37 that directs air against the active surface 6 of the impellers 4 as they pass by the modified base 20a of the cylinder 9a.

In operation, waves 38 raise and lower the tank 32, pumping air into the turbine 1 through the modified cylinder 9a and air outlet 37 to drive it and the generators 22. An advantage of this arrangement is that the turbine 1 can continue to generate power when the wind drops if waves 38 are present.

As depicted, the turbine, when mounted on a ship's hull 39 can be driven simultaneously by wind and wave 38 energy. Other sources of compressed air may, however, be provided. For example, compressed air stored in an underground salt dome can be built-up by air compressors that are driven by surplus electrical power. The turbine 1 itself may be the source of such power. The turbine of the invention in such cases is useful because of the capacity of the turbine rotor 1 to receive wind directly from between the vanes 9; and also to receive air coming from a compressed air source that is directed through the interior of at least one of such sealed vanes 9a to impel rotation of the rotor 1.

Figure 5:
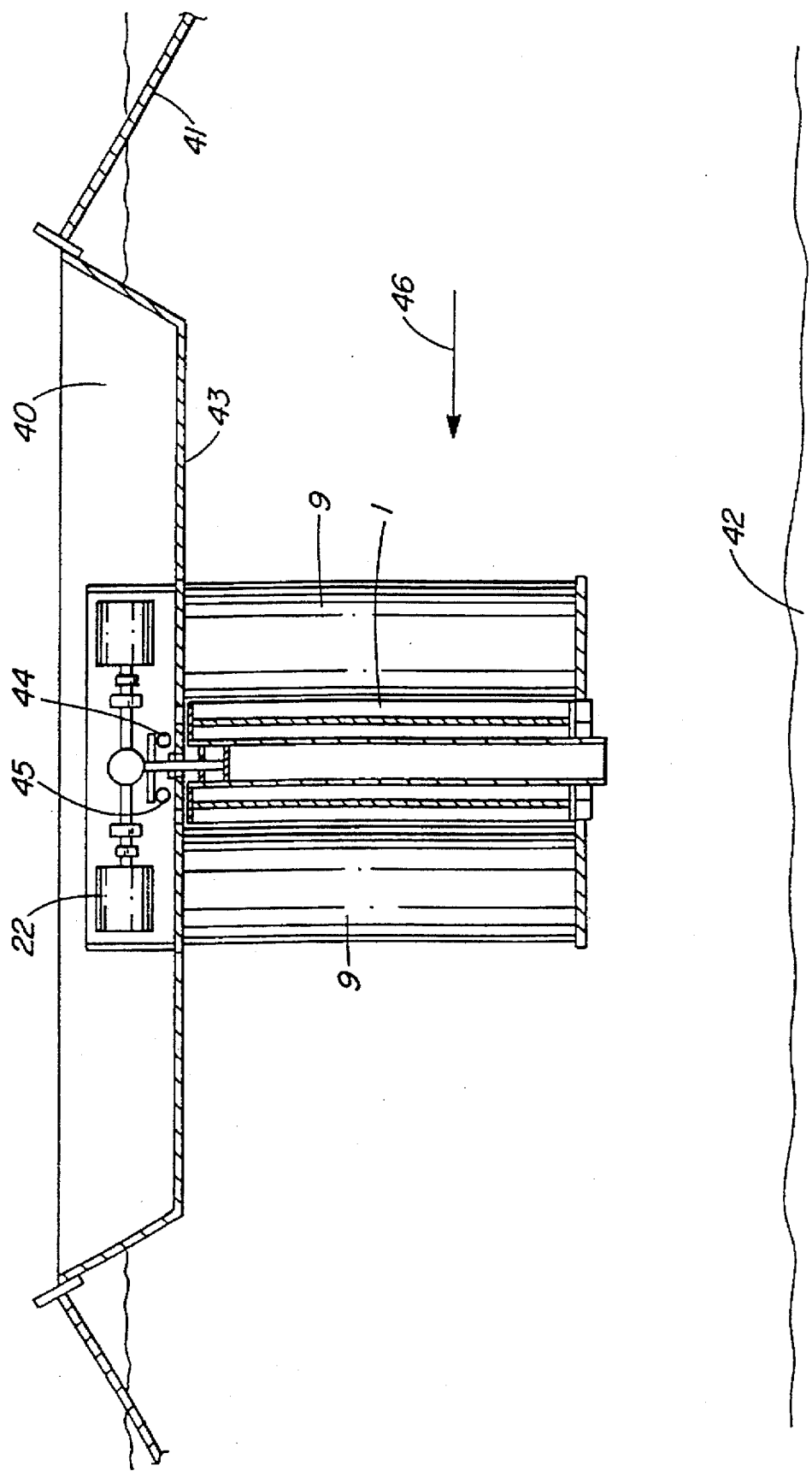
FIG. 5 is a cross-sectional depiction of the turbine of FIG. 1 immersed in a water current.

According to a further application of the invention as depicted in FIG. 5, the turbine of the invention may be inverted and mounted with its rotor entirely or partially immersed in water. In such applications, the generators 22 are positioned above the rotor 1.

In FIG. 5, a barge 40 is anchored by cables 41 in shallow water above the sea bed 42. Preferably, the barge 1 is positioned in a tidal race or where reciprocating water flow 46 arises, as from wave action.

The turbine rotor 1 is immersed with the vanes 9 below the barge 40. The axle shaft 23 of the rotor 1 penetrates through the hull 43 of the barge 40, sealed by a water-tight seal 44. A bearing 45 supports the axle shaft 23. As previously depicted, generators 22 are coupled to the rotor 1 through a shaft coupling system which may include a differential 18.

Because of the deflecting action of the vanes 9, the turbine can receive water flow 46 from several directions. Thus, both when the tide flows in, and when it ebbs back to sea.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. A vertical axis turbine having a turbine rotor with a vertical axis and an outer circumferential rotor boundary and impellers with vertical wind-receiving impeller surfaces, said vertical impeller surfaces extending from the outer circumferential rotor boundary inwardly to form part of an impeller cavity which prevents air from entering centrally within the turbine, said turbine comprising:
   (1) a surrounding circumferential series of vertically deployed deflector vanes mounted between upper and lower end plates that support the turbine rotor,
   (2) each of said vanes being tubular in shape, widening from an edge at its outer circumferential boundary proceeding towards the turbine axis to a vertical surface constituting a base located at the inner boundary of each vane, said base being positioned next to the outer circumferential path of the turbine,
whereby air arriving from all directions is concentrated and directed against the turbine impeller surfaces and is contained momentarily in the impeller cavity by said base surfaces in a substantially sealed state as the impellers pass by the base of each of said vanes and wherein one of said vanes comprises:
   (a) a closed hollow interior;
   (b) an air inlet; and
   (c) an air outlet positioned at the base of said hollow vane to direct air towards said impeller surfaces,
whereby when a supply of pressurized air is introduced through the air inlet said air is directed through said air outlet against said impellers as the turbine rotates.

2. A turbine as in claim 1 in combination with a source of compressed air.

3. A turbine as in claim 2 wherein said compressed air source is a wave-activated compressed air source which provides compressed air in response to wave action.

4. A turbine as in claim 3 wherein said wave-activated compressed air source and said turbine are both carried and supported by a vessel anchored on a body of water.

* * * * *